(12) United States Patent
Brady et al.

(10) Patent No.: US 8,055,730 B2
(45) Date of Patent: Nov. 8, 2011

(54) SYSTEM HAVING A NETWORK CONNECTED TO MULTIPLE DIFFERENT TYPES OF SURVEY SENSORS

(75) Inventors: James P. Brady, Houston, TX (US); William A. C. Cannell, Nesbru (NO); Lionel Beneteau, Kolsas (NO); Thorleiv Knutsen, Asker (NO)

(73) Assignee: WesternGeco L. L. C., Houston, TX (US)

( * ) Notice: Subject to any disclaimer, the term of this patent is extended or adjusted under 35 U.S.C. 154(b) by 281 days.

(21) Appl. No.: 12/174,263

(22) Filed: Jul. 16, 2008

(65) Prior Publication Data
US 2010/0017138 A1    Jan. 21, 2010

(51) Int. Cl.
*G06F 15/16* (2006.01)
*G01V 1/00* (2006.01)
(52) U.S. Cl. .......................... 709/219; 702/14
(58) Field of Classification Search ........... 709/219–225
See application file for complete search history.

(56) References Cited

U.S. PATENT DOCUMENTS

| 6,735,630 | B1 | 5/2004 | Gelvin et al. | |
|---|---|---|---|---|
| 7,567,084 | B2 * | 7/2009 | Eidesmo et al. | 324/334 |
| 2004/0129890 | A1 * | 7/2004 | Berman et al. | 250/380 |
| 2005/0194182 | A1 | 9/2005 | Rodney et al. | |
| 2006/0153004 | A1 * | 7/2006 | Berg | 367/37 |
| 2007/0225944 | A1 | 9/2007 | Knutsen | |
| 2008/0079723 | A1 * | 4/2008 | Hanson et al. | 345/427 |
| 2008/0236837 | A1 * | 10/2008 | Lovell et al. | 166/336 |

OTHER PUBLICATIONS

Den Boer, et al., Resistivity Imaging of Shallow Salt with Magnetotellurics as an Aid to Prestack Depth Migration, First Break, Jan. 2000, pp. 19-26, vol. 18.
Dupuis, et al., Seismoelectric Imaging of the Vadose Zone of a Sand Aquifer, Geophysics, Nov.-Dec. 2007, pp. A81-A85, vol. 72, No. 6.
PCT Search Report, dated Dec. 31, 2009, Application No. PCT/US2009/050593 (11 pages).
IPRP, dated Jan. 27, 2011, Application No. PCT/US2009/050593 (6 pages).

* cited by examiner

*Primary Examiner* — Yasin Barqadle

(57) ABSTRACT

A system includes a network, multiple different types of survey sensors connected to the network, and a controller connected to the network. The multiple different types of survey sensors are configured to communicate different types of measurement data over the network to the controller.

18 Claims, 3 Drawing Sheets

SYSTEM HAVING A NETWORK CONNECTED TO MULTIPLE DIFFERENT TYPES OF SURVEY SENSORS

TECHNICAL FIELD

The invention relates generally to a network that is connected to multiple different types of survey sensors that are able to communicate different types of measurement data over the network to a controller.

BACKGROUND

Subterranean surveying is used to perform characterization of subterranean elements in a subterranean structure. Examples of subterranean elements of interest include hydrocarbon-bearing reservoirs, fresh water aquifers, gas injection zones, and other subterranean elements.

One type of subterranean surveying includes seismic surveying, in which seismic sources (e.g., air guns, vibrators, explosives, etc.), and seismic sensors (e.g., hydrophones, geophones, accelerometers, etc.) are deployed. The seismic sources are used to produce seismic waves that are propagated into the subterranean structure, with some of the seismic waves reflected from the subterranean elements of interest. The reflected seismic waves are detected by the seismic sensors.

Other types of subterranean surveying include electromagnetic (EM) surveying that uses EM (artificially created or naturally occurring) sources and EM sensors, gravity surveying that uses gravity sensors to make local gravity measurements of the earth which can lead to an indicator of the earth's density, and others. Other survey types include mixed source/receiver combinations, e.g., seismic sources with EM receivers or EM sources with seismic receivers.

The hardware for performing the various different subterranean surveys have tended to be custom designed for each specific type of measurement of interest (e.g., seismic measurement, EM measurement, or gravity measurement). As a result, conventional surveying solutions do not provide for an efficient manner of considering (acquiring and recording) different types of measurement data that may be available.

SUMMARY

In general, according to an embodiment, a system includes a network, multiple different types of survey sensors connected to the network, and a controller connected to the network. The multiple different types of survey sensors are configured to communicate different types of measurement data over the network to the controller.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a survey system is provided to enable different types of survey measurements to be acquired by different types of sensor units and communicated over a common backbone network to a controller for processing. A "backbone network" refers to any common network that is used to communicate data associated with multiple network entities (which in this discussion includes sensor units and a controller). The backbone network can include communications links, routers, switches, and other network entities that are involved in the communication of data between endpoints.

The survey system is able to acquire multiple co-located survey measurements simultaneously or closely spaced in time in such a way that errors inherent in data acquisitions separated in time are eliminated, and in such a way that the basic acquisition system infrastructure is optimized in terms of cost and efficiency. The survey system is able to acquire, as examples, the following different types of measurement data: seismic data, gravity data, and/or electromagnetic (EM) data (electric field data and/or magnetic field data), in response to natural and/or artificial sources. Artificial sources include acoustic sources such as vibrators, air guns, explosives, or EM sources such as EM transmitters used in controlled source EM (CSEM) surveying. Natural sources are sources that produce source survey signals naturally, such as naturally occurring EM signals, naturally occurring acoustic signals, gravity signals, and so forth.

Moreover, the survey system allows the recording of cross-responses, e.g., seismic response to EM stimulation, EM response to seismic (acoustic) stimulation, and so forth. The different types of measurements are synchronized and thus co-located (or nearly so) in time and space. It may be desirable to include seismic signals in one part of a large network and EM signals in a different part of the network. The advantages of using the same control, transmission, and recording mechanism helps make acquisition more efficient even if there are limited or no benefits of spatial or temporal co-location.

Figure 1:
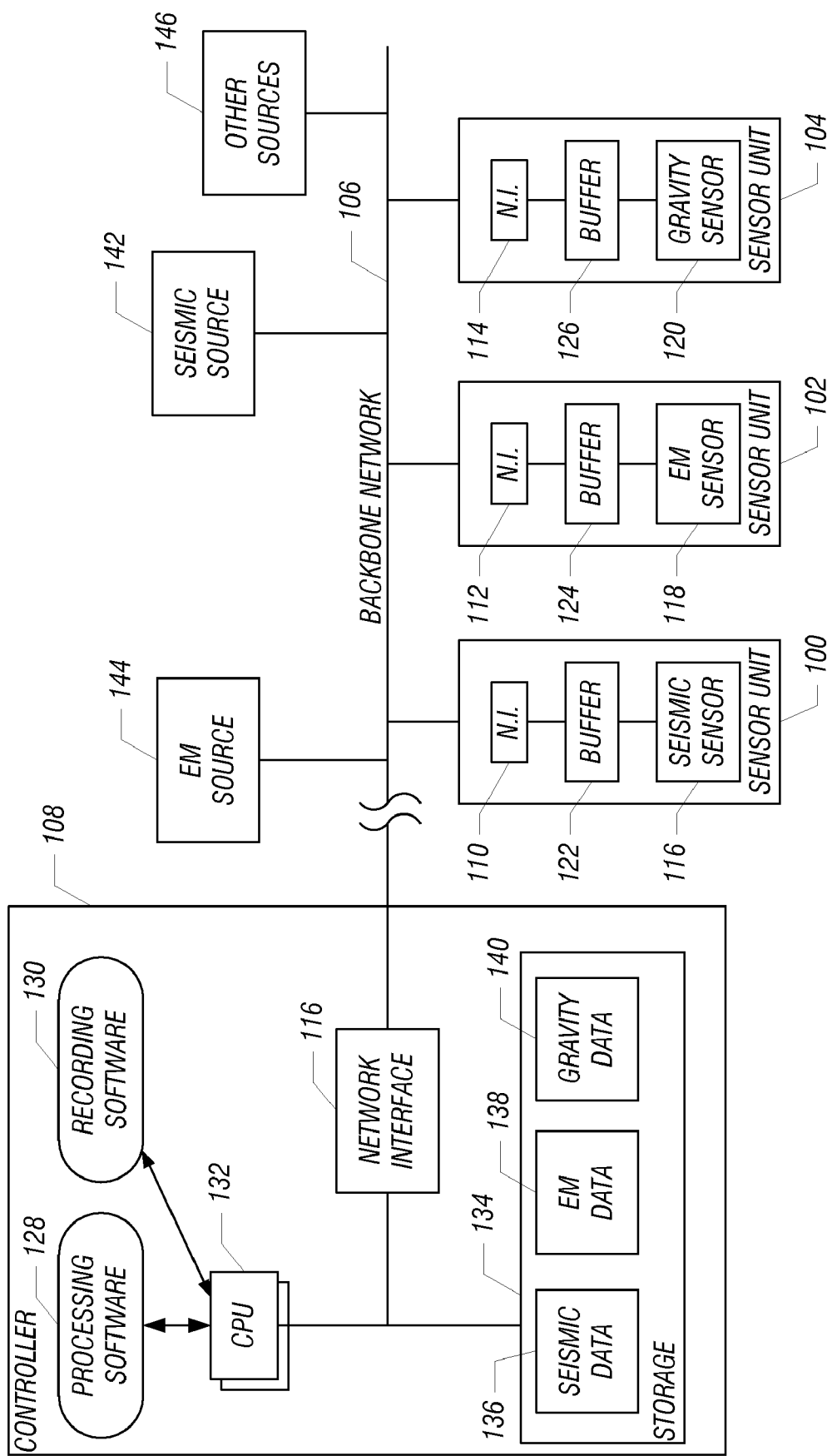
FIG. 1 is a block diagram of an exemplary arrangement that includes a controller, a network, and multiple different types of survey sensors, in accordance with an embodiment.

FIG. 1 illustrates an exemplary arrangement that includes different types of sensor units 100, 102, and 104 that are connected to a backbone network 106. The backbone network 106 is in turn connected to a controller 108. Note that the backbone network 106 can include communications links (e.g., cables, wireless links, fiber optic links) in addition to network nodes such as routers, switches, and so forth.

Each of the sensor units 100, 102, 104, and the controller 108 includes a corresponding network interface 110, 112, 114, and 116, respectively, to enable the corresponding nodes to communicate over the backbone network 106. The backbone network 106 can communicate data according to a standard protocol, such as an Internet Protocol (IP). Moreover, a transport layer protocol can also be used for communication over the backbone network 106, such as the Transmission Control Protocol (TCP). If TCP/IP is used, then a TCP/IP layer may be part of the network interface 110, 112, 114, 116. In other implementations, the backbone network 106 can communicate data according to other types of standard protocols, or according to proprietary or customized protocols.

The sensor unit 100 includes a seismic sensor 116, the sensor unit 102 includes an EM sensor 118, and the sensor unit 104 includes a gravity sensor 120. The seismic sensor 116 is used to detect seismic waves reflected from subterranean elements of a subterranean structure, in response to acoustic waves produced by an acoustic source (or multiple acoustic sources). The EM sensor 118 is used to detect EM waves that are affected by the subterranean elements of the subterranean structure, in response to EM waves transmitted by one or more EM sources. Alternatively, the EM sensor 118 can detect naturally occurring EM fields, according to a magnetotelluric (MT) EM survey technique. The gravity sensor 120 is able to make a local gravity measurement of the subterranean structure to determine the density of a portion of the subterranean structure.

Note that although one of each type of sensor is depicted in FIG. 1, it is noted that multiple instances of each type of sensor can be used in an actual arrangement. Moreover, it is noted that one or more of the sensor units can be deployed on a land surface, on a water bottom surface (e.g., sea floor), in a wellbore, towed through water, and so forth.

Each of the sensor units 100, 102, and 104 further includes a corresponding buffer 122, 124, and 126, respectively, for storing measurement data detected by the corresponding sensors 116, 118, and 120, respectively. Each buffer is used to temporarily store the measurement data until the measurement data can be successfully communicated over the backbone network 106 to the controller 108. In this manner, data does not have to be buffered in the backbone network 106, which can add complexity to the backbone network 106. This results in a direct data transfer from each sensor unit to the controller 108, which can be possible using a protocol such as TCP/IP, for example.

The controller 108 includes processing software 128 and recording software 130, both of which are executable on one or more central processing units (CPUs) 132. Although depicted as two separate software modules, note that the processing software 128 and recording software 130 can be integrated into a single software module. The CPU(s) 132 is (are) connected to the network interface 116, and also to a storage 134. The storage 134 can be used to store the different types of measurement data communicated from the sensor units to the controller 108, including seismic data 136, EM data 138, and gravity data 140. Recording of the different types of data in the storage 134 is managed by the recording software 130. Processing of the recorded data is performed by the processing software 128.

The lines depicted in FIG. 1 that connect each sensor unit 100, 102, 104 to the backbone network 106 can be wired links or wireless links. A wired link includes one or more wires or electrical conductors. A wireless link can be a link in which data is carried over radio frequency (RF) signals, acoustic signals, infrared signals, inductive signals, or other types of wireless signals.

Gravity sensor units would benefit greatly from using wireless communications in some implementations. This is because a gravity sensor typically requires an acoustically quiet environments, which is not the case for seismic survey operations. One example of a gravity sensor 120 is a gravimeter.

The gravity sensor units can be placed further away from seismic sensor units such that the seismic operations do not interfere with the gravity measurements taken by the gravity sensor units. Since it is desirable that all measurements are co-located spatially and as close as possible in time, it may well be the case that the gravity sensor unit is collecting data where the active part of a seismic spread is or shortly will be. The same is also true for EM sensor units.

The EM sensor 118 can measure electric fields or magnetic fields, or both. If multiple EM sensor units are provided, then different ones of the EM sensor units can measure electric fields while others measure magnetic fields.

An EM sensor for measuring an electric field can include dipole antennas to sample electric fields in up to three different orientations (x, y, z orientations). A magnetic field sensor can include one or more induction coils, flux gate magnetometers, or other devices that are capable of sampling magnetic fields, or changes in magnetic fields, in up to three different orientations.

The seismic sensor 116 can be a hydrophone, geophone, or accelerometer. A hydrophone is an underwater device used to detect acoustic waves. A geophone is used to convert ground movement (such as due to acoustic waves) to an electrical signal (e.g., voltage). An accelerometer measures gravity and acceleration induced reaction forces.

As further depicted in FIG. 1, the controller 108 is also capable of controlling various survey sources, including a seismic source 142 and an EM source 144. Control of the survey sources 142, 144 is accomplished by sending commands to the survey sources to cause them to be activated. Although the survey sources 142, 144 are depicted as being connected to the backbone network 106, it is noted that the survey sources 142, 144 can be communicated over a separate network to the controller 108.

The controller 108 is also able to record the source signals produced by the seismic and EM sources 142 and 144. In this manner, the controller is able to time align the source signals with respect to the measurement data collected from the sensor units. The survey source signals and measurement data from the sensor units can be associated with respective timestamps to allow for the time alignment.

Not only is the controller 108 able to measure and record distinct survey measurements (gravity, EM, seismic data), but the controller 108 is also able to measure induced effects (e.g., cross-responses) of the different types of measurement data. The simultaneous acquisition and control of a seismic source and EM sensors provides an electro-seismic measurement (the measured EM data is affected by the seismic signals produced by the seismic source). Similarly, the simultaneous acquisition and control of an EM source and seismic sensors provides a seismo-electric measurement (the seismic data measured by the seismic sources is affected by the EM signals).

When multiple types of sensors are approximately co-located, joint analysis of the measurement data is allowed, which addresses the issues which typically arise from performing different types of surveys at different times. For example, when performing different types of surveys at different times, different weather conditions, different temperatures, different ambient noise, and differences in source parameters can cause the measurement data to differ. Electro-seismic measurements offer a reliable way to model the seismic effect on the EM signal, and similarly, seismo-electric measurements allow for a reliable way to model the EM effect on a seismic signal.

In addition to survey measurements taken by the different types of sensor units (measurements that are affected by a subterranean structure), additional sensors 146 can also be provided, such as thermometers, barometric pressure sensors, wind gauges, and so forth, which can gather data which may later be used to help the processing software 128 process data. The other sensors 146 can also include soil samplers that may be connected to sample soil. Soil samplers are useful for detecting petrochemical or gas seepage through the soil, but can also possibly detect environmental effects such as rain or ground water. The other sensors 146 are also connected to the backbone network 106 to communicate their respective measurement data to the controller 128.

While the principal use of survey measurements is to identify or characterize potential hydrocarbon targets, an ancillary capability of the survey system according to some embodiments is to help characterize the near surface (layer near the earth surface) above the target of interest. Near surface geophysics is primarily concerned with understanding the seismic wavefield in the weathered layer that is typically the first few meters to few hundred meters. Often, the seismic wavefield can be distorted in this area. Being able to incorporate near surface density (via gravity measurements) and resistivity (via EM measurements) will help better resolve the near surface media characteristics that will allow for better modeling of the acoustic propagation in the near-surface area. This will then allow for better interpretation of the seismic wavefields deeper into the subterranean structure.

To distinguish different types of data packets communicated over the backbone network 106 from the sensor units, each data packet can include a header that contains some information identifying the type of instrumentation that was used to collect the measurement data contained in the data packet. An example of a data format that can be used to record data is the SEGD Rev. 2.1 Standard, in one example. Other defined data formats (whether standardized or proprietary formats) can be used in other implementations. SEGD Rev. 3.0 is a format being proposed and revised to allow for more efficient recording of non-seismic geophysical data.

The SEGD format supports the notion of channel sets, which is a collection of all samples from all sensors with the same settings (type, sample rate, filter, etc.) in the selected time window. When data is sent from the sensor units that have different settings, such as type, sample rate, filter, these will be sorted into different channel sets within the same SEGD record.

The processing software 128 in the controller 108 is able to extract from any recorded data all or a selected portion of measurement data within a predefined time window. The selected measurement data can be displayed jointly in the time or frequency domain. Presenting different types of measurement data jointly for a given time window allows for performance of quality control. It may be observed, for example, that the EM response is inconsistent with the seismic response, which can indicate a problem with one or both of the EM and seismic sensors. Presenting the measurement data can be performed by displaying the measurement data in a graphical layout in a display device, such as in the form of a chart, graph, table, and so forth.

Figure 2:
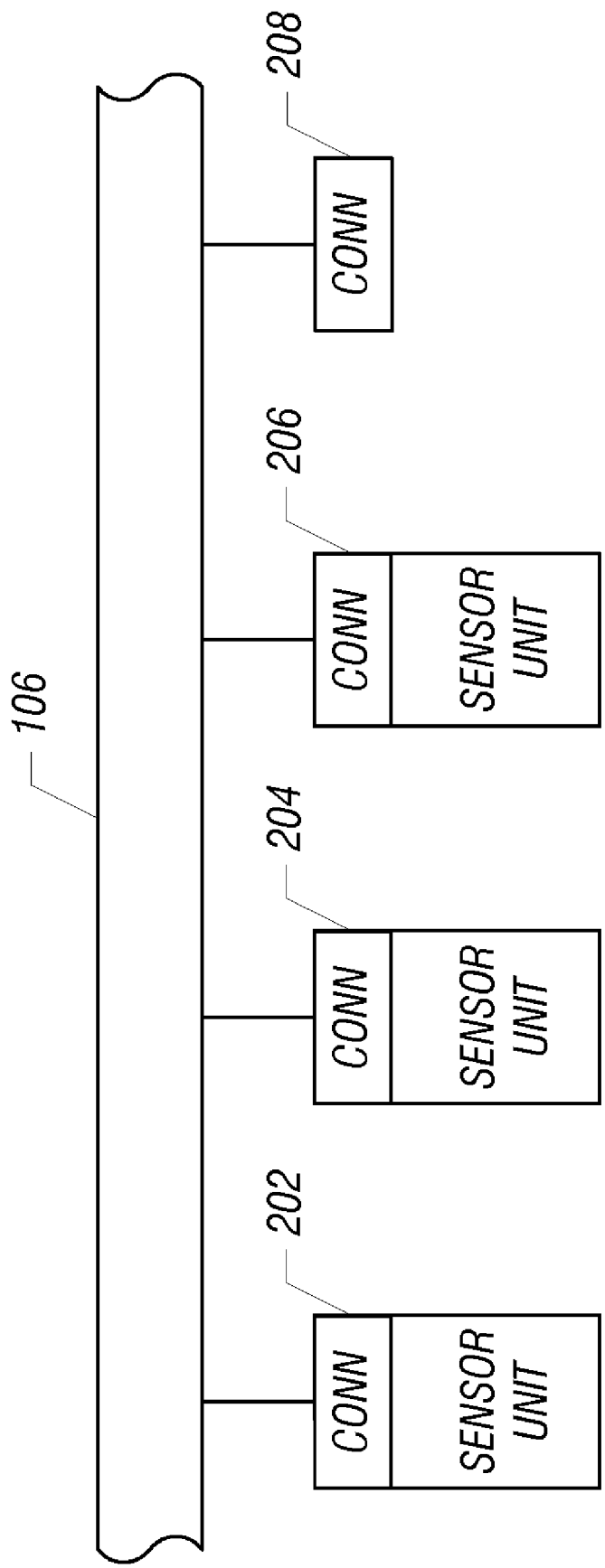
FIG. 2 is a schematic diagram of a network that is connected to different types of survey sensors.

FIG. 2 shows that the backbone network 106 can be provided with connectors 202, 204, 206, and 208 for connection to corresponding sensor units. For ease of use, a sensor unit can be unplugged from a particular connector, with another sensor unit plugged into the particular connector. Connector 208 is depicted as being unplugged to any sensor unit. This allows a survey operator to insert a sensor unit of choice into the connector 208.

When a sensor unit is inserted into a connector, the sensor unit can send some type of description information to the controller to allow the controller to identify what type of sensor unit has been connected to the network 108. The description information can be in the form of a description packet, for example.

For purposes of quality control, the survey system is also able to obtain in real-time detailed information about the performance of a particular type of source, such as a seismic source. For example, a seismic sensor can measure mass and baseplate acceleration measurements in response to a signal from the seismic source, which enables such data to be integrated with the measurement data at the time of acquisition, and used for more detailed quality control and processing of the measurement data than can be achieved with synthetically generated source reference information. This is potentially useful in quality control and processing of cross-response data that is typically of much lower resolution and more prone to degradation through inaccuracies and/or inconsistencies in source performance.

Figure 3:
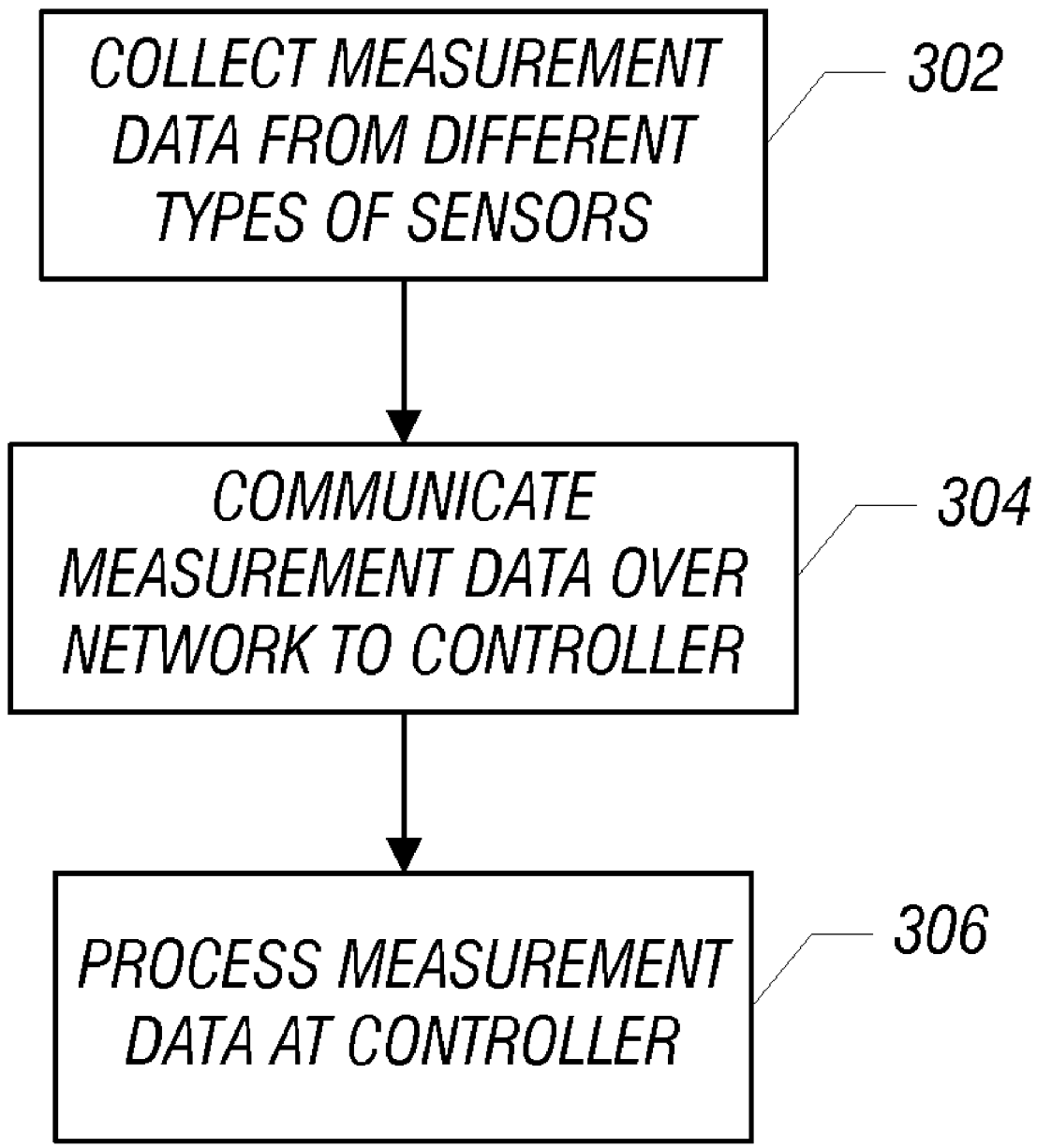
FIG. 3 is a flow diagram of a process of acquiring and processing different types of measurement data from the different types of survey sensors, according to an embodiment.

FIG. 3 is a general flow diagram of a process that can be performed with the survey system in accordance with some embodiments. Measurement data is collected (at 302) using the different types of sensors, including survey measurement data from seismic sensors, EM sensors, and gravity sensors. In addition to survey measurement data, other types of measurement data can also be collected, such as temperature data, information related to weather conditions, information related to soil samples, and so forth.

The different types of measurement data are communicated (at 304) over the backbone network to a controller. As discussed above, each sensor unit has a buffer to temporarily store measurement data that is to be communicated over the backbone network. The buffers can be used to alleviate bandwidth restrictions that may be present in the backbone network, such that many sensor units attempting to communicate data at the same time would not overwhelm the backbone network.

The different types of measurement data received by the controller 108 are recorded at the controller 108 (by the recording software 130), and then processed (at 306) by the processing software 128 at the controller 108. Results from the processing can then be presented to the survey operator. The processing can produce an image or other representation of the subterranean structure that is being surveyed. As noted above, the processing at 306 can also include determining cross-responses, such as electro-seismic measurements and/or seismo-electric measurements.

Instructions of software described above (including processing software 128 and recording software 130 of FIG. 1) are loaded for execution on a processor (such as one or more CPUs 132 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A system comprising:
a network;
multiple different types of survey sensors connected to the network; and
a controller connected to the network,
wherein the multiple different types of survey sensors are configured to communicate different types of measurement data in packets over the network to the controller, wherein each of the packets contains information identifying a corresponding type of survey sensor that provided the measurement data carried by the respective packet, and wherein the controller is configured to determine a cross-response of a first type of the different types of survey sensors to stimulation of a second type that is different from the first type, where the cross-response comprises one of: (1) a seismic response as measured by the first type of survey sensor to electromagnetic stimulation of the second type from a source, or (2) an electromagnetic response as measured by the first type of survey sensor to seismic stimulation of the second type from a source.

2. The system of claim 1, wherein the multiple different types of sensors include at least two different types of sensors selected from among a seismic sensor, electromagnetic sensor, and a gravity sensor.

3. The system of claim 1, wherein the survey sensors and the controller are configured to communicate over the network according to an Internet Protocol (IP).

4. The system of claim 1, wherein the survey sensors and the controller are configured to communicate over the network according to a Transmission Control Protocol (TCP) and Internet Protocol (IP).

5. The system of claim 1, wherein the controller is configured to receive co-located survey measurements from the different types of survey sensors simultaneously or closely spaced in time.

6. The system of claim 1, further comprising sensor units, the survey sensors being part of corresponding sensor units, wherein each sensor unit includes a network interface to communicate the packets over the network.

7. The system of claim 6, wherein each sensor unit further includes a corresponding buffer to temporarily store measurement data collected by the respective survey sensor.

8. The system of claim 1, wherein the information identifying the type of survey sensor is part of a header of each packet.

9. The system of claim 1, further comprising at least one additional sensor separate from the survey sensors to collect another type of measurement data.

10. The system of claim 9, wherein the at least one additional sensor includes at least one sensor selected from a thermometer, barometric pressure sensor, wind gauge, and soil sampler.

11. The system of claim 1, wherein the network is associated with connectors, and wherein the survey sensors are part of corresponding sensor units that are removably pluggable to the connectors.

12. A system comprising:
a network;
multiple different types of survey sensors connected to the network; and
a controller connected to the network,
wherein the multiple different types of survey sensors are configured to communicate different types of measurement data over the network to the controller, wherein the measurement data contains information to identify a corresponding type of the different types of the survey sensor that provided the respective measurement data,
wherein the controller is configured to determine a cross-response of the different types of survey sensors, the cross-response including a response of a first type of the different types of survey sensors to stimulation of a second type that is different from the first type, wherein the cross-response comprises one of: (1) a seismic response as measured by the first type of survey sensor to electromagnetic stimulation of the second type from a source, or (2) an electromagnetic response as measured by the first type of sensor to seismic stimulation of the second type from a source.

13. A method of performing subterranean surveying, comprising:
providing a backbone network connected to a plurality of different types of survey sensors;
collecting different types of measurement data by the corresponding different types of survey sensors;
communicating the different types of measurement data over the network to a controller for recording, the measurement data containing information to identify a corresponding type of the different types of survey sensors that provided the respective measurement data; and
determining a cross-response based on activating a first type of source and measuring a response to stimulation provided by the first type of source using a second type of survey sensor, wherein the cross-response comprises one of: (1) a seismic response as measured by the second type of survey sensor to electromagnetic stimulation from the first type of source, or (2) an electromagnetic response as measured by the second type of survey sensor to seismic stimulation from the first type of source.

14. The method of claim 13, wherein communicating the different types of measurement data comprises communicating using packets according to an Internet Protocol (IP).

15. The method of claim 13, wherein collecting the different types of measurement data comprises collecting at least two types selected from among gravity data, seismic data, and electromagnetic data.

16. The method of claim 13, wherein communicating the different types of measurement data over the network comprises communicating the different types of measurement data in packets, and wherein each of the packets has a header containing the information to identify a corresponding type of the different types of the survey sensors that provided the measurement data contained in the respective packet.

17. At least one non-transitory computer-readable storage medium containing instructions that when executed cause a computer to:
receive different types of measurement data collected by corresponding different types of survey sensors over a network, wherein the measurement data is communicated using packets according to an Internet Protocol (IP);
record the different types of measurement data, each of the packets containing information to identify a corresponding type of the different types of survey sensors that provided the respective measurement data in the respective packet; and
process the different types of measurement data together, wherein the processing includes determining a cross-response, the cross-response including a response of a first type of the different types of survey sensors to stimulation of a second type that is different from the first type, wherein the cross-response comprises one of: (1) a seismic response as measured by the first type of survey sensor to electromagnetic stimulation from the second type of source, or (2) an electromagnetic response as measured by the first type of survey sensor to seismic stimulation from the second type of source.

18. The at least one computer-readable storage medium of claim 17, wherein the different types of survey sensors include at least two types selected from among gravity sensors, electromagnetic sensors, and seismic sensors.

* * * * *